United States Patent [19]

Fujioka et al.

[11] 4,389,451

[45] Jun. 21, 1983

[54] ELECTROSTATIC RECORD MATERIAL

[75] Inventors: Hironari Fujioka, Takatsuki; Hajime Matsubayashi, Akashi, both of Japan

[73] Assignee: Kanzaki Paper Manufacturing Company, Ltd., Japan

[21] Appl. No.: 345,366

[22] Filed: Feb. 3, 1982

[30] Foreign Application Priority Data

Feb. 13, 1981 [JP] Japan ................................ 56-20322

[51] Int. Cl.$^3$ ........................ B32B 7/02; G01D 15/06

[52] U.S. Cl. .................................... 428/212; 162/138; 346/135.1; 427/121; 428/206; 428/209; 428/211; 428/323; 428/325; 428/328; 428/329; 428/330; 428/331; 428/403; 428/404; 428/406; 428/407; 428/537; 428/701; 428/702

[58] Field of Search ..................... 162/138; 346/135.1; 427/121, 146, 180, 212; 428/206–209, 211, 323, 325, 327, 328, 330, 331, 403, 404, 406, 407, 537, 701, 702, 212, 329, 511, 514

[56] References Cited

U.S. PATENT DOCUMENTS 3,516,911 6/1970 Hopps ............................ 346/135.1
3,944,705 3/1976 Fujioka et al. ...................... 427/121
3,956,562 5/1976 Shibata et al. ...................... 427/121

FOREIGN PATENT DOCUMENTS 2025264 1/1980 United Kingdom ................ 428/323

*Primary Examiner*—Bruce H. Hess
*Attorney, Agent, or Firm*—Larson and Taylor

[57] ABSTRACT

An electrostatic record material comprising an electroconductive base sheet and a record layer formed on the base sheet and composed mainly of insulating resin, the record material being characterized in that the electroconductive base sheet has an electroconductive layer comprising (1) electron conductive particles produced by coating the particles of an inorganic compound with an electroconductive substance consisting of stannic oxide and a small amount of antimony and (2) a water-soluble adhesive composed of salts of a copolymer of at least 20 mole % of acrylic acid or methacrylic acid monomer.

3 Claims, No Drawings

ELECTROSTATIC RECORD MATERIAL

This invention relates to an electrostatic record material.

Electrostatic recording processes use a record material comprising an electroconductive base sheet and a record layer formed on the base sheet and composed mainly of insulating resin. With these processes, voltage pulses are applied directly to the front, rear or both sides of the record layer of the material or electrostatic latent images formed on a plate are transferred onto the record layer to form electrostatic latent images on the record layer, and the latent images are converted to visible images with a coloring powder (toner). Electrostatic recording processes are widely used for facsimile systems, other printers, etc.

While facsimile systems using such electrostatic record material were operated at a low speed of 5 to 6 min/A-4-size sheet, such low-speed machines have been replaced by medium-speed machines (2–3 min/A-4-size sheet) or high-speed machines (less than 1 min/A-4-size sheet or higher) with an increase in the amount of information to be handled. To cope with the speed-up of the operation, the machines have been modified in the means for the impression of voltage pulses; formerly all voltage pulses were applied to pin electrodes as in low-speed machines, but in the new system, voltage pulses are separately impressed to pin electrodes and to subelectrodes or back-electrodes. Accordingly the voltage pulse width used has changed from 500 μsec or longer to 50–100 μsec or to 20 μsec or shorter. To obtain satisfactory records with stability in accordance with the various changes attendant on the speed-up of the facsimile systems, the electrostatic record material must have reduced impedance. Usually the electroconductive base sheet of an electrostatic record material most favorably has a surface electrical resistivity of $10^6$ to $10^9$ ohms and is adapted to have such optimal resistivity. Especially for use in high-speed facsimile systems, the record material must meet a very strict resistivity requirement. For example, a reduced image density will result at a surface electrical resistivity of $10^{10}$ ohms, and little or no record will be reproduced at $10^{11}$ ohms.

As stated above, the electroconductive base sheet of an electrostatic record material is adapted to have a resistivity of $10^6$ to $10^9$ ohms at ambient humidity. However, an electroconductive base sheet has an increased resistivity, for example when allowed to stand at a low humidity for a prolonged period of time. The reason is as follows. The treating agent usually used for rendering the base sheet electroconductive is a high-molecular-weight electrolyte in which the conductivity is due to ionization. Therefore, as the humidity lowers, the conductive base sheet has a reduced water content, thereby giving a decreased amount of dissociated ions and thus an increased resistivity.

It was proposed (in Japanese Unexamined Patent Publication No. 12927/1980) to use an electron conductive powder such as an electroconductive zinc oxide powder, indium oxide powder or tin oxide powder in place of the high molecular weight electrolyte liable to be affected by moisture. However, such electron conductive powders provide a reduced image density at high humidities, although giving a good image density at low humidities. Further, the foregoing electron conductive powders are found to have the drawback of imparting an exceedingly low image density in an atmosphere in which the humidity varies alternately between low and high levels. The image density of electrostatic record materials containing such electron conductive powder is seriously influenced by the atmosphere varying alternately between low and high humidities (hereinafter referred to merely as "humidity cycle") to which the record materials are exposed. As far as recording characteristics are concerned, a humidity cycle is independent from a low or high humidity. For example, electrostatic record materials, even if excellent in recording characteristics at low and high humidities, do not always have good recording characteristics in a humidity cycle.

It is the main object of this invention to provide electrostatic record materials which exhibit outstanding recording characteristics in a humidity cycle.

Another object of this invention is to provide electrostatic record materials which display good recording characteristics at any humidity, i.e. low to high humidities and a humidity cycle.

A further object of this invention is to provide electrostatic record materials satisfactorily usable for high-speed facsimile systems as well as other printers.

These and other objects of this invention will become apparent from the following description.

The foregoing objects of this invention are accomplished by providing an electrostatic record material comprising an electroconductive base sheet and a record layer formed on the base sheet and composed mainly of insulating resin, the record material being characterized in that the electroconductive base sheet has an electroconductive layer comprising (1) electron conductive particles produced by coating the particles of an inorganic compound with an electroconductive substance consisting of stannic oxide and a small amount of antimony and (2) a water-soluble adhesive composed of salts of a copolymer of at least 20 mole % of acrylic acid or methacrylic acid monomer (hereinafter referred to as acrylic or methacrylic monomer).

Our research reveals that when using as an electron conductive powder, inorganic compound particles coated with stannic oxide and antimony, and as a water-soluble adhesive, salts of copolymer containing at least 20% of acrylic or methacrylic monomer, the record materials exhibit remarkable recording characteristics in a humidity cycle as well as at low to high humidities.

The electron conductive powder to be used in this invention has a specific resistivity of $10^{-2}$ to $10^3$ ohm·cm, preferably $10^{-1}$ to $5\times10^2$ ohm·cm at pressure of 150 kg/cm$^2$ and contains particles of inorganic compound coated with stannic oxide and antimony so as to give the aforesaid specific resistivity. Examples of useful inorganic compounds are aluminium oxide, zinc oxide, titanium oxide, zirconium oxide, magnesium oxide, silicon oxide and like metal oxides; aluminium hydroxide and like metal hydroxides; calcium carbonate, barium carbonate and like carbonates; calcium sulfate, barium sulfate and like sulfates; clay; kaolin; zeolite; glass powder, etc. Particles of the inorganic compound are preferably less than 1.5 μm, and more preferably less than 1.0 μm in mean size.

The particles of these inorganic compounds are coated with stannic oxide and antimony usually by the following methods. One method comprises the steps of mixing together a tin compound, an antimony compound and inorganic compound particles, and heat-treating the mixture under such conditions that the two compounds decompose and oxidize to form a semi-conductor of $SnO_2$-Sb around each inorganic compound particle. The heat-treatment is carried out usually at 500° to 800° C., preferably at 600° to 700° C. for 1 to 2 hours. Exemplary of useful tin compounds are tetramethyltin, tetraethyltin, tetrapropyltin, tetrabutyltin, trimethylethyltin trimethylpropyltin, triethylpropyltin, dimethyldiethyltin dimethyldibutyltin, diethyldibutyltin, dipropylmethylethyltin and like alkyltins; trimethylchlorotin, trimethylbromotin, dimethyldichlorotin, dimethyldibromotin and like alkyltin halides; tin caprate tin oxalate, tin acetate and like organic tin compounds; tin tetrachloride, tin tetrabromide and like tin halides; etc.

Useful antimony compounds includes antimony halides such as antimony trichloride, antimony tribromide and antimony triiodide.

Another method comprises the steps of dispersing in a hot water particles of inorganic compound to prepare a hot suspension and adding to the suspension a solution of tin chloride and antimony chloride in alcohol to form on the inorganic compound particles a layer comprising 0.1 to 20% by weight of antimony and the remaining components substantially consisting of stannic oxide.

According to this invention, the inorganic compound particles are coated with a layer comprising 0.1 to 20% by weight of antimony and the remaining components substantially consisting of stannic oxide. The total amount of the stannic oxide and antimony used for coating the inorganic compound particles is about 5 to about 70% of the whole weight of the conductive powder.

With this invention, it is necessary to use as adhesive salts of a copolymer containing at least 20 mole % of acrylic or methacrylic monomer.

The acrylic or methacrylic monomer content of less than 20 mole % results in the reduction of suitability to a humidity cycle, and thus in failure to obtain a desired electrostatic record material. Therefore, salts of a copolymer should be used which contain at least 20 mole %, more preferably at least 30 mole % of acrylic or methacrylic monomer in the molecule. However, an excessive content of acrylic or methacrylic monomer, for example, as high as over 80 mole % deteriorates the water resistance of the adhesive. Thus a maximum content thereof is preferably limited to less than 80 mole %, more preferably less than 70 mole %.

Examples of the other monomer forming the copolymer with the acrylic or methacrylic monomer are methylacrylate, ethylacrylate, n-butylacrylate, isobutylacrylate, t-butylacrylate, 2-ethylhexylacrylate, decylacrylate, 2-ethoxyethylacrylate, 2-hydroxypropylacrylate and like acrylates, methylmethacrylate, ethylmethacrylate, n-butylmethacrylate, isobutylmethacrylate, t-butylmethacrylate, hexylmethacrylate, laurylmethacrylate, stearylmethacrylate, cyclohexylmethacrylate, dimethylaminoethylmethacrylate, t-butylaminoethylmethacrylate, 2-hydroxyethylmethacrylate, 2-hydroxypropylmethacrylate, glycidylmethacrylate and like methacrylates, styrene, sodium styrenesulfonate, acrylonitrile, methacrylonitrile, acrylamide, methacrylamide, N,N-dimethylacrylamide, vinyl chloride, vinylidene chloride, vinyl acetate, butadiene, etc. Among these monomers, styrene, butylacrylate, butylmethacrylate, 2-ethylhexylacrylate, 2-hydroxyethylmethacrylate, acrylamide, etc. are especially suited to copolymerization and contribute to formation of highly adhesive and inexpensive copolymers, hence desirable. Examples of copolymers formed by use of such monomers are styrene-acrylic acid, butylacrylate-acrylic acid, styrene-butylacrylate-methacrylic acid, acrylamidebutylacrylate-methacrylic acid, styrene-acrylamidebutylacrylate-methacrylic acid, 2-ethylhexylacrylatebutylacrylate-methacrylic acid and 2-hydroxyethylmethacrylatebutylacrylate-methacrylic acid copolymers.

According to this invention, these copolymers are used as neutralized and solubilized by ammonia or amine singly or in admixture with an inorganic basic material.

A water-soluble adhesive composed of salts of the above-specified copolymer is used in an amount of 3 to 100 parts by weight, preferably 10 to 65 parts by weight, per 100 parts by weight of the electron conductive powder. If the amount is less than 3 parts by weight, the resulting electroconductive layer has a reduced adhesiveness insufficient to serve the purpose. Conversely, the use of an adhesive in excess of 100 parts by weight leads to a marked increase in the surface resistivity of the electroconductive layer.

With this invention, the electron conductive powder and the specific water-soluble adhesive are dispersed and dissolved in water to form a coating composition. A wide variety of auxiliary agents as required can be suitably incorporated into such coating composition inasmuch as they do not reduce the contemplated effects. Examples of useful auxiliaries are polyvinyl alcohol, methyl cellulose, hydroxyethyl cellulose, carboxymethyl cellulose, starch, modified starch, polyvinyl pyrrolidone, sodium alginate, polyacrylamide, styrene-butadiene copolymer latex, vinyl acetate latex, acrylic acid latex and like nonionic, weakly anionic and cationic latexes, salt of styrenemaleic anhydride copolymer, salt of isobutene-maleic anhydride copolymer and like adhesives, calcium carbonate, barium sulfate, titanium oxide, clay, kaolin, zeolite, aluminum oxide, silicon oxide, aluminum hydroxide, polystyrene microball and like organic or inorganic pigments, aluminum-, gallium- or indium-doped zinc oxide, antimony-doped tin oxide, tin-doped indium oxide, copper iodide and like electron conductive particles, sodium chloride, potassium chloride, sodium nitrate, calcium chloride, sodium hydroxide, potassium hydroxide, calcium hydroxide and like inorganic compounds, sodium polystyrenesulfonate, sodium polyacrylate and like water soluble anionic resins, dispersants, defoaming agents, dyes, ultraviolet absorbers, etc. The coating composition thus prepared is applied to paper, synthetic paper and like usual base sheet to form at least an electroconductive layer in contact with a record layer. The coating composition can be applied by any means such as a bar coater, air knife coater or blade coater or by impregnation with use of a size press. Of the two methods, the former is preferably adopted. The composition is applied to the base sheet in such an amount that the sheet will have a surface resistivity of $10^6$ to $10^9$ ohms at the ambient humidity. The amount is usually 2 to 20 $g/m^2$, preferably about 3 to about 15 $g/m^2$ by dry weight.

According to this invention, the record layer can be formed from any of various coating compositions usually used and including those of the organic solvent type and aqueous solution or dispersion type. The resins useful for preparing such coating compositions are those having insulating properties and including polymers or copolymers of vinyl monomers such as vinyl chloride, vinyl acetate, vinyl acetal, vinylidene chloride, ethylene, styrene, butadiene, acrylate, methacrylate, acrylonitrile, acrylic acid, methacrylic acid, etc, silicone resin, polyester resin, polyurethane resin, alkyd resin, epoxy resin and the like. These resins are used singly or in admixture as dissolved in an organic solvent or dispersed in water. The resins useful for the electrostatic record material of this invention are not limited to these resins, but other suitable known insulating resins are also usable. The coating composition may further incorporate additives usually used in the art, such as inorganic pigments, finely divided polymer particles, starch powder and dyes. The composition is applicable by usual means in an amount which, although not particularly limited, is usually 2 to 10 g/m$^2$, preferably 4 to 7 g/m$^2$ by dry weight.

While another electroconductive layer is conventionally formed on the other surface of the base sheet opposite to the record layer bearing surface thereof when so required, such a conductive layer can be similarly formed in this invention if so desired. The additional conductive layer need not always be the same as the specific conductive layer of this invention underlying the record layer but can be a conductive layer composed of a usual high molecular weight electrolyte.

The electrostatic record materials thus prepared according to this invention have an excellent suitability to a humidity cycle and provide record images at a high density with high stability at extremely lower to high humidities.

Given below for a better understanding of the present invention are examples of this invention and comparison examples in which all parts and percentages are by weight unless otherwise indicated. The examples of the invention are not to be considered as limiting the scope of the invention in any way.

EXAMPLE 1

Used as an electron conductive powder is 80 parts of tin oxide compound particles (product of Mitsubishi Metal Corporation, Japan) prepared by doping titanium oxide particles with stannic oxide and antimony as electroconductive materials and having a specific resistivity of 20 ohm·cm at pressure of 150 kg/cm$^2$. The tin oxide compound particles (80 parts) are dispersed in 120 parts of water by a ball mill for 1 hour. To the dispersion is added 100 parts of 20% aqueous solution of methacylic acid-butylacrylate-styrene copolymer (mole ratio of 50:30:20) to obtain an electroconductive coating composition. The coation composition is applied to one side of wood-free paper weighing 49 g/m$^2$ in an amount of 4 g/m$^2$ by dry weight and dried at 100° C. by a hot air dryer for 1 minute to form an electroconductive layer on the base sheet. Four samples are prepared in the same manner. Three of them are allowed to stand for 48 hours at a low humidity (20° C., 10% RH), an ambient humidity (25° C., 55% RH) and a high humidity (30° C., 80% RH), respectively. The other sample is left to stand in a humidity cycle specified below. Then the four samples are checked for surface resistivity by a resistivity meter, Model No. VE-30, (trade mark "TERAOHMMETER", product of Kawaguchi Electric Mfg. Co., Japan) by applying DC10V across each sample. The term "humidity cycle" used herein refers to the conditions under which the sample is left to stand for 48 hours at 30° C. and 80% RH and subsequently for 48 hours at 20° C. and 10% RH, and is checked for surface resistivity at 20° C. and 10% RH.

A 400-part portion of 20% methyl ethyl ketone solution of a vinyl chloride-vinyl acetate (50:50) copolymer is mixed with 20 parts of calcium carbonate. The mixture is thoroughly stirred by a mixer to prepare a coating composition for a record layer. The coating composition is applied to the electroconductive layer on the base sheet by a bar coater in an amount of 5 g/m$^2$ by dry weight to obtain an electrostatic record material.

Four sheets of the electrostatic record material thus prepared are tested for recording characteristics by the following method.

The three sheets are allowed to stand for 48 hours at a low humidity (20° C., 10% RH), an ambient humidity (25° C., 55% RH) and a high humidity (30° C., 80% RH), respectively. The other sheet is left to stand in the humidity cycle specified above. Each of the sheets is then recorded on a high-speed facsimile at a line density of 8 l/mm, pulse width of 12 μsec, pin voltage of −300 V, subvoltage of +300 V and with use of a magnetic dry toner under the respective humidity conditions. The image density is measured by Macbeth densitometer Model No.RD-100R (product of Macbeth Co., Ltd., U.S.A.) in terms of reflection density. Table 1 shows the results.

EXAMPLES 2 TO 5

Four kinds of electrostatic record materials are prepared in the same manner as in Example 1 except that in place of the methacrylic acid-butylacrylatestyrene copolymer (mole ratio of 50:30:20) used as the adhesive in Example 1, the following four adhesives are used for respective sheets; (1) a copolymer comprising the same components as the copolymer of Example 1 but having a different mole ratio of 30:50:20, (2) a copolymer comprising the same components but with a different ratio of 70:10:20, (3) a methacrylic acidbutylmethacrylateacrylamide copolymer having a mole ratio of 50:30:20 (trade mark: KSA-318, product of Arakawa Kagaku Kogyo Kabushiki Kaisha, Japan) and (4) an acrylic acid-butylacrylate copolymer having a mole ratio of 60:40. The four kinds of record materials thus prepared are tested for surface resistivity and recording characteristics in the same manner as in Example 1. Table 1 shows the results.

COMPARISON EXAMPLES 1 TO 4

Four kinds of electrostatic record materials are prepared in the same manner as in Example 1 except that in place of the adhesive used in Example 1, the following adhesives are used for respective sheets; (1) a methacrylic acid-butylacrylate-styrene copolymer having a mole ratio of 15:65:20, (2) a styrene-butadiene latex (trade mark: SN 304, product of Sumitomo Naugatuck Co., Ltd., Japan), (3) sodium polystyrenesulfonate (trade mark: ERP-B, product of Mitsubishi Chemical Industries Ltd., Japan) and (4) a modified starch (trade mark: Ace A, product of Oji Cornstarch Co., Ltd., Japan). The four kinds of record materials are tested for surface resistivity and recording characteristics in the same manner as in Example 1. Table 1 shows the results.

EXAMPLES 6 TO 7 AND COMPARISON EXAMPLES 5 TO 6

Four kinds of electrostatic record materials are prepared in the same manner as in Example 1 with the exception of varying the ratio of the electron conductive tin oxide compound particles and the adhesive as used in Example 1 (hereinafter referred to as "P/B ratio") as shown in Table 1. The four kind of record materials are tested for surface resistivity and recording characteristics with the results indicated in Table 1.

EXAMPLES 8 TO 9 AND COMPARISON EXAMPLE 7

Particles of the following inorganic compounds are used as the core material for an electron conductive substance: zinc white (trade mark: HF, product of Honjo Chemical Corp., Japan), kaolin (trade mark: UW-90, product of Engelhard Minerals & Chemical Corp., U.S.A.) and titanium oxide (trade mark: FA-55W, product of Furukawa Co., Ltd., Japan). Further, the composition ratio of the tin compound and antimony compound, the baking temperature and baking time are varied to prepare three kinds of electron conductive particles having the specific resistivity as shown in Table 1. Subsequently three kinds of electroconductive coating compositions are prepared in the same manner as in Example 1 using the three kinds of electron conductive particles with the exception of adopting the P/B ratio of 90:10. Three kinds of electrostatic record materials are prepared in the same manner as in Example 1 with the exception of applying each coating composition to one side of woodfree paper in an amount of 10 g/$m^2$ by dry weight. The sheets are tested for surface resistivity and recording characteristics. Table 1 shows the results.

As apparent from the results in Table 1, the electrostatic record materials prepared in all of the examples are found to be excellent in the suitability to the humidity cycle and to produce record images at a high density with high stability at low to high humidities.

TABLE 1

| | Electron conductive powder | | | | | Surface resistivity (ohm) | | | | Recording characteristics (ohm) | | | |
|---|---|---|---|---|---|---|---|---|---|---|---|---|---|
| | Electroconductive material/core material | Resistivity | Adhesive (Mole ratio) | P/B ratio | Amount | LH | AH | HH | HC | LH | AH | HH | HC |
| Ex. 1 | $SnO_2$—Sb/$TiO_2$ | 20 ohm · cm | Methacrylic acid-butylacrylate-styrene copolymer (50:30:20) | 80/20 | 4 $g/m^2$ | $8.0 \times 10^6$ | $1.5 \times 10^7$ | $2.0 \times 10^7$ | $1.5 \times 10^7$ | 1.1-1.2 | 1.4-1.5 | 1.0-1.1 | 1.1-1.2 |
| Ex. 2 | $SnO_2$—Sb/$TiO_2$ | 20 ohm · cm | Methacrylic acid-butylacrylate-styrene copolymer (30:50:20) | " | " | $9.0 \times 10^6$ | $1.5 \times 10^7$ | $2.0 \times 10^7$ | $9.0 \times 10^7$ | 1.1-1.2 | 1.4-1.5 | 1.0-1.1 | 0.9-1.0 |
| Ex. 3 | $SnO_2$—Sb/$TiO_2$ | 20 ohm · cm | Methacrylic acid-butylacrylate-styrene copolymer (70:10:20) | " | " | $6.0 \times 10^6$ | $1.2 \times 10^7$ | $1.0 \times 10^7$ | $1.0 \times 10^7$ | 1.1-1.2 | 1.4-1.5 | 1.0-1.1 | 1.1-1.2 |
| Ex. 4 | $SnO_2$—Sb/$TiO_2$ | 20 ohm · cm | Methacrylic acid-butylmethacrylate-acrylamide copolymer (50:30:20) | " | " | $9.0 \times 10^6$ | $1.3 \times 10^7$ | $2.0 \times 10^7$ | $1.5 \times 10^7$ | 1.1-1.2 | 1.4-1.5 | 1.0-1.1 | 1.1-1.2 |
| Ex. 5 | $SnO_2$—Sb/$TiO_2$ | 20 ohm · cm | Acrylic acid-butylacrylate copolymer (60:40) | " | " | $9.0 \times 10^6$ | $1.5 \times 10^7$ | $2.0 \times 10^7$ | $1.5 \times 10^7$ | 1.1-1.2 | 1.4-1.5 | 1.0-1.1 | 1.1-1.2 |
| Com. Ex. 1 | $SnO_2$—Sb/$TiO_2$ | 20 ohm · cm | Methacrylic acid-butylacrylate-styrene copolymer (15:65:20) | " | " | $1.2 \times 10^7$ | $2.5 \times 10^7$ | $3.5 \times 10^7$ | $4.0 \times 10^9$ | 1.0-1.1 | 1.3-1.4 | 1.0-1.1 | 0.6-0.8 |
| Com. Ex. 2 | $SnO_2$—Sb/$TiO_2$ | 20 ohm · cm | Styrene-butadiene latex | " | " | $1.2 \times 10^9$ | $5.0 \times 10^8$ | $1.2 \times 10^7$ | $3.0 \times 10^9$ | 0.6-0.8 | 0.9-1.0 | 1.0-1.1 | 0.6-0.8 |
| Com. Ex. 3 | $SnO_2$—Sb/$TiO_2$ | 20 ohm · cm | Sodium polystyrene sulfonate | " | " | $1.5 \times 10^7$ | $1.0 \times 10^7$ | $9.0 \times 10^5$ | $4.0 \times 10^7$ | 1.0-1.1 | 1.4-1.5 | 0.5-0.6 | 1.1-1.2 |
| Com. Ex. 4 | $SnO_2$—Sb/$TiO_2$ | 20 ohm · cm | Modified starch | " | " | $3.0 \times 10^7$ | $6.0 \times 10^7$ | $1.0 \times 10^9$ | $5.0 \times 10^7$ | 1.0-1.1 | 1.2-1.3 | 0.6-0.8 | 1.0-1.1 |
| Ex. 6 | $SnO_2$—Sb/$TiO_2$ | 20 ohm · cm | Methacrylic acid-butylacrylate-styrene copolymer (50:30:20) | 90/10 | " | $9.0 \times 10^6$ | $9.0 \times 10^6$ | $8.0 \times 10^6$ | $1.0 \times 10^7$ | 1.1-1.2 | 1.4-1.5 | 1.0-1.1 | 1.1-1.2 |
| Ex. 7 | $SnO_2$—Sb/$TiO_2$ | 20 ohm · cm | Methacrylic acid-butylacrylate-styrene copolymer (50:30:20) | 70/30 | " | $1.5 \times 10^7$ | $2.0 \times 10^7$ | $2.5 \times 10^7$ | $1.9 \times 10^7$ | 1.1-1.2 | 1.4-1.5 | 1.0-1.1 | 1.1-1.2 |
| Com. Ex. 5 | $SnO_2$—Sb/$TiO_2$ | 20 ohm · cm | Methacrylic acid-butylacrylate-styrene copolymer (50:30:20) | 98/2 | " | Unmeasurable due to insufficiency of adhesiveness of electroconductive layer | | | | | | | |
| Com. Ex. 6 | $SnO_2$—Sb/$TiO_2$ | 20 ohm · cm | Methacrylic acid-butylacrylate-styrene copolymer (50:30:20) | 40/60 | " | $7.0 \times 10^{10}$ | $9.0 \times 10^9$ | $8.0 \times 10^7$ | $7.0 \times 10^{10}$ | 0.2-0.3 | 0.3-0.4 | 0.9-1.0 | 0.2-0.3 |
| Ex. 8 | $SnO_2$—Sb/zinc white | 600 ohm · cm | Methacrylic acid-butylacrylate-styrene copolymer (50:30:20) | 90/10 | 10 | $5.0 \times 10^7$ | $6.5 \times 10^7$ | $5.5 \times 10^7$ | $8.0 \times 10^7$ | 0.9-1.0 | 1.3-1.4 | 0.9-1.0 | 0.8-0.9 |
| Ex. 9 | $SnO_2$—Sb/kaolin | 900 ohm · cm | Methacrylic acid-butylacrylate-styrene copolymer (50:30:20) | " | " | $8.0 \times 10^7$ | $9.0 \times 10^7$ | $7.0 \times 10^7$ | $9.8 \times 10^7$ | 0.9-1.0 | 1.3-1.4 | 0.9-1.0 | 0.8-0.9 |
| Com. Ex. 7 | $SnO_2$—Sb/$TiO_2$ | 1500 ohm · cm | Methacrylic acid-butylacrylate-styrene copolymer (50:30:20) | " | " | $5.0 \times 10^8$ | $9.0 \times 10^8$ | $1.5 \times 10^9$ | $6.0 \times 10^8$ | 0.7-0.9 | 0.6-0.8 | 0.6-0.8 | 0.6-0.8 |

The abbreviations LH, AH, HH and HC used in Table 1 stand for low humidity, ambient humidity, high humidity and humidity cycle, respectively.

We claim:

1. An electrostatic record material comprising an electroconductive base sheet and a record layer formed on the base sheet and composed mainly of insulating resin, the record material being characterized in that the electroconductive base sheet has an electroconductive layer comprising (1) electron conductive particles produced by coating the particles of an inorganic compound with an electroconductive substance consisting of stannic oxide and 0.1 to 20 percent by weight of antimony, the electron conductive particles having a specific resistivity of $10^{-2}$ to $10^3$ ohm. cm. at a pressure of 150 kg/cm$^2$ and (2) a water-soluble adhesive composed of salts of a copolymer of at least 20 mole % of acrylic acid or methacrylic acid monomer, the amount of the water-soluble adhesive being 3 to 100 parts by weight per 100 parts by weight of the electron conductive particles.

2. An electrostatic record material according to claim 1 in which the specific resistivity is $10^{-1}$ to $5\times10^2$ ohm·cm.

3. An electrostatic record material according to claim 1 in which the copolymer contains 30 to 80 mole % of acrylic acid or methacrylic acid monomer.

* * * * *